2,993,829
HALOBENZENESULFONYL HYDRAZIDE FUNGICIDES

Alan J. Lemin, Richland Township, Kalamazoo County, Mich., assignor to The Upjohn Company, Kalamazoo, Mich., a corporation of Michigan
No Drawing. Filed Sept. 18, 1958, Ser. No. 761,693
12 Claims. (Cl. 167—30)

This invention relates to a method for controlling the growth of phytopathogenic fungi and to novel compositions useful therein, and is more particularly directed to the use of halobenzenesulfonyl hydrazides, acid addition salts thereof, alkali metal salts thereof, and copper salts thereof for the control of fungi.

In accordance with the present invention, it has been found that compounds having the formula

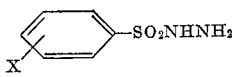

wherein X represents a halogen atom, acid addition salts thereof, alkali metal salts thereof, and copper salts thereof, are effective for the control of phytopathogenic fungi.

It is an object of the present invention to provide a method for the control of phytopathogenic fungi by application to plants, subject to fungus infection, of a compound having the above Formula I, either in free base form or in salt form. It is a further object of the invention to provide novel fungicidal compositions containing as active ingredient at least one compound of the above Formula I, either in free base form or in salt form. Other objects of the invention will be apparent to those skilled in the art to which this application pertains.

The halobenzenesulfonyl hydrazides of the above Formula I can be prepared by methods well known in the art. For example, the compounds can be obtained by reaction of the appropriate halobenzenesulfonyl chloride with hydrazine. The halobenzenesulfonyl chlorides which can be used as starting materials include o-, m- and p-chlorobenzene-sulfonyl chlorides, o-, m-, and p-bromobenzenesulfonyl chlorides, o-, m-, and p-iodobenzenesulfonyl chlorides, and p-fluorobenzenesulfonyl chloride; see Beilsteins Handbuch der Organischen Chemie, fourth edition, 1928, vol. 11, pages 53, 54, 55, 56, 57, 64, and 65.

The acid addition salts of the compounds having the Formula I are formed advantageously by neutralizing the free halobenzenesulfonyl hydrazide with the appropriate acid. Acids which are suitable for the purpose include: hydrochloric acid, sulfuric acid, phosphoric acid, nitric acid, citric acid, acetic acid, lactic acid, oxalic acid, succinic acid, and the like. The alkali metal salts of the compounds having the Formula I above include the sodium, potassium, ammonium and lithium salts, and can be prepared by neutralizing a compound having the Formula I with an alkali metal hydroxide such as sodium hydroxide, potassium hydroxide, ammonium hydroxide, and lithium hydroxide. The copper salts of the compounds having the Formula I are prepared in a convenient manner by a process of metathesis, for example, by reacting an aqueous solution of an alkali metal or ammonium salt of a compound having the Formula I with an aqueous solution of a soluble salt of copper, such as copper sulfate, copper chloride and the like. The copper salts of the compounds having the Formula I are substantially insoluble in water and are therefore precipitated in the metathetical reaction described above.

The following examples are illustrative of the preparation of the compounds having the Formula I above, and of their acid addition salts, alkali metal salts, and copper salts, but are not to be construed as limiting.

Example 1.—p-chlorobenzenesulfonyl hydrazide and the hydrochloride thereof

A. *Free base.*—One milliliter of hydrazine was added to a suspension of 0.5 gram of p-chlorobenzenesulfonyl chloride in five milliliters of 95 percent ethanol, whereupon a vigorous reaction occurred. The reaction mixture was cooled and thirty milliliters of water was added. The solid product was recovered by filtration, washed successively with water and 95 percent ethanol, and dried. There was thus obtained p-chlorobenzenesulfonyl hydrazide in the form of a crystalline solid having a melting point of 112 to 114 degrees centigrade.

*Anal.*—Calcd. for $C_6H_7ClN_2O_2S$: N, 13.53; Cl, 17.18. Found: N, 13.03; Cl, 16.70.

B. *Hydrochloride.*—Concentrated hydrochloric acid (1.1 milliliters) was added to a suspension of 2.15 grams (0.01 mole) of p-chlorobenzenesulfonyl hydrazide in ten milliliters of absolute ethanol. By evaporating the reaction mixture to dryness under reduced pressure, p-chlorobenzenesulfonyl hydrazide hydrochloride was obtained as a crystalline solid.

Example 2.—p-bromobenzenesulfonyl hydrazide

Using the procedure described in Example 1A, but substituting p-bromobenzenesulfonyl chloride for p-chlorobenzenesulfonyl chloride, there was obtained p-bromobenzenesulfonyl hydrazide in the form of a crystalline solid having a melting point of 117 to 119 degrees centigrade.

*Anal.*—Calcd. for $C_6H_7BrN_2O_2S$: N, 11.15; Br, 31.85. Found: N. 11.31; Br, 32.18.

Similarly, by following the procedure described in Example 1A, but replacing p-chlorobenzenesulfonyl chloride by p-fluorobenzenesulfonyl chloride, o-chlorobenzene-sulfonyl chloride, m-chlorobenzenesulfonyl chloride, o-bromobenzenesulfonyl chloride, m-bromobenzenesulfonyl chloride, o-iodobenzenesulfonyl chloride, m-iodobenzenesulfonyl chloride, and p-iodobenzenesulfonyl chloride, there were obtained p-fluorobenzenesulfonyl hydrazide, o-chlorobenzenesulfonyl hydrazide, m-chlorobenzenesulfonyl hydrazide, o-bromobenzenesulfonyl hydrazide, m-bromobenzenesulfonyl hydrazide, o-iodobenzenesulfonyl hydrazide, m-iodobenzenesulfonyl hydrazide, and p-iodobenzenesulfonyl hydrazide, respectively.

Example 3.—Sodium salt of p-chlorobenzenesulfonyl hydrazide

To a solution of 0.972 gram (0.0242 mole) of sodium hydroxide in 100 milliliters of water was added five grams (0.0242 mole) of p-chlorobenzenesulfonyl hydrazide. The clear solution was evaporated to dryness under reduced pressure at approximately forty degrees centigrade. There was thus obtained the solid sodium salt of p-chlorobenzenesulfonyl hydrazide.

Using the procedure described in Example 3 above, but substituting potassium hydroxide for sodium hydroxide, there was obtained the potassium salt of p-chlorobenzenesulfonyl hydrazide.

Using the procedure described in Example 3 above, but substituting ammonium hydroxide for sodium hydroxide, there was obtained the ammonium salt of p-chlorobenzenesulfonyl hydrazide.

Using the procedures described above, but replacing p-chlorobenzenesulfonyl hydrazide by the appropriate halobenzenesulfonyl hydrazide, there were obtained the sodium, potassium and ammonium salts of o-chlorobenzenesulfonyl hydrazide, m-chlorobenzenesulfonyl hydrazide, p-fluorobenzenesulfonyl hydrazide, o-bromobenzenesulfonyl hydrazide, m-bromobenzenesulfonyl hydrazide, p-bromobenzenesulfonyl hydrazide, o-iodobenzenesulfonyl hydrazide, m-iodobenzenesulfonyl hydrazide, and p-iodobenzenesulfonyl hydrazide.

*Example 4.—Cupric salt of p-chlorobenzenesulfonyl hydrazide*

An aqueous solution of p-chlorobenzenesulfonyl hydrazide sodium salt was prepared by adding five grams (0.0242 mole) of p-chlorobenzenesulfonyl hydrazide to 100 milliliters of water containing 0.972 gram of sodium hydroxide. The clear solution so obtained was treated with a solution of 1.63 grams (0.0121 mole) of cupric chloride dissolved in fifteen milliliters of water plus one drop of concentrated hydrochloric acid. The solid which separated was collected by filtration, washed with water and dried. There was thus obtained 3.8 grams of the cupric salt of p-chlorobenzenesulfonyl hydrazide which decomposed above 250 degrees centigrade without melting.

*Anal.*—Calcd. for $C_6H_6ClN_2O_2S \cdot \frac{1}{2}$ Cu: Cu, 13.4 Found: Cu, 13.16.

By following the procedure set forth in Example 4, but replacing p-chlorobenzenesulfonyl hydrazide by m-chlorobenzenesulfonyl hydrazide, o-chlorobenzenesulfonyl hydrazide, o-bromobenzenesulfonyl hydrazide, m-bromobenzenesulfonyl hydrazide, p-bromobenzenesulfonyl hydrazide, o-iodobenzenesulfonyl hydrazide, m-iodobenzenesulfonyl hydrazide, p-iodobenzenesulfonyl hydrazide, and p-fluorobenzenesulfonyl hydrazide, there were obtained the corresponding cupric salts.

The compounds having the Formula I above, the acid addition salts thereof, the alkali metal salts thereof, and the copper salts thereof (hereinafter referred to as the "active compounds") are effective in the control of phytopathogenic fungi. Illustratively, the compounds and their salts, as hereinbefore defined, can be employed for the control, both protective and eradicative, of powdery mildew (*Erysiphe cichoricearum*) on cucumbers and of bean rust (*Uromyces phaseoli*). In order to achieve effective control of these and other phytopathogenic fungi, the active compounds of the invention are applied to plants in the form of compositions, to be described hereinafter, in which the concentration of the active compounds is within the range of about fifty parts per million to about 5000 parts per million. The preferred concentration range is of the order of about 125 parts per million to about 3000 parts per million. Suitably the rate is adjusted to between about 0.125 and five pounds per acre, preferably to between about 0.5 and three pounds per acre. Illustratively, p-chlorobenzenesulfonyl hydrazide when applied as a foliar spray in concentrations of 1000 and 2000 parts per million, the application rates being one and two pounds per acre, respectively, produced complete eradication of established powdery mildew on cucumbers.

The active compounds of the invention need not be used in pure condition for the treatment of plants, since in the method and formulations of the invention the active compounds are dispersed in a phytonomic carrier, that is to say, a carrier that can be applied to the plants without phytotoxicity or other effects on the plants.

The active compounds of the invention can be used alone or in combination with other fungicidal, virucidal, insecticidal, bactericidal, or acaricidal materials. Surfactants, and if desirable, other adjuvants such as stickers, can be present. Any of the conventional wetting and dispersing agents of the anionic, cationic, and nonionic types that are commonly employed in compositions for controlling infections of plants can be used. Suitable surfactants having sufficient wetting activity for the purposes of this invention include alkyl sulfates and sulfonates, alkylbenzenesulfonates, sulfosuccinate esters, polyoxyethylene sulfates, polyoxyethylene sorbitan monolaurate, alkylarylpolyether alcohols, alkylnaphthalenesulfonates, alkyl quaternary ammonium salts, sulfated fatty acid esters, sulfated fatty acid amides, glycerol mannitan laurate, polyalkylether condensates of fatty acids and ligninsulfonates, the sulfates and sulfonates of course being used in the form of their soluble salts, for example, the sodium salts. All these surfactants are capable of reducing the surface tension of water to less than about forty dynes per centimeter in concentrations of about one percent or less. Suitable phytonomic carriers for active agents of the invention include water containing such a surfactant, or an inert dusting powder such as talc, pyrophyllite, diatomite, clays such as bentonite, Georgia clay, Attapulgus clay, wood or walnut shell flour, and the like. Dusting powder is understood to be a solid material comminuted so that it has an average particle size less than fifty microns, advantageously less than fifteen microns. The carrier also can be a water-dispersible powder such as is obtained commonly by incorporating a surfactant in a dusting powder. All or part of the carrier can be a phytonomic oil, for example, summer oil.

A suitable formulation is obtained by blending and milling 327 pounds of Georgia clay, 4.5 pounds of Triton X–100 (an alkylaryl polyether alcohol) as a wetting agent, nine pounds of Daxad 27 (polymerized sodium salt of substituted benzoid long-chain sulfonic acid) as a dispersing agent, and 113 pounds of the active compound. The resulting formulation has the following percentage composition (parts herein are by weight unless otherwise specified).

| | Percent |
|---|---|
| Active compound | 25 |
| Triton X–100 | 1 |
| Daxad 27 | 2 |
| Georgia clay | 72 |

This formulation, when dispersed in water at one pound per 100 gallons, gives a spray formulation containing about 0.03 percent (300 parts per million) active ingredient.

Another suitable formulation is obtained by mixing approximately equal parts of the active ingredient and pyrophyllite, comminuting either before or after the admixture as desired, to produce a dusting powder, and dispersing the resulting product in an aqueous vehicle with the aid of a surfactant. Suitable surfactants include sodium lauryl sulfate, sodium and calcium ligninsulfonates, 1-tetradecyl-4-methylpyridinium chloride, Triton X–100, and Pluronic F–68 (ethylene oxide-propylene glycol condensate, nonionic surfactant). If desired, the surfactant can be incorporated in the dry mixture either by dry milling or by adding it in solution in a volatile solvent such as ethanol or acetone, mixing to form a paste, drying, and milling.

Another suitable formulation is obtained by dissolving the active material in a water-miscible solvent such as dimethylformamide or dimethyl sulfoxide. The concentration in such solutions can range from about 0.5 percent active compound up to a saturated or near saturated solution. An illustrative formulation consists of ten parts of active compound and ninety parts of dimethylformamide or other solvent. On adding such a solution and a surfactant, such as exemplified above, to water, aqueous suspensions and/or solutions of the active ingredient are obtained of a concentration according to the proportions used. If desired, the surfactant can be included in the solution. A suitable preparation is obtained by dissolving one part of the active compound and one part of Triton X–100 in 98 parts of dimethylformamide.

It will of course be appreciated by plant husbandrymen that the conditions encountered when applying the method and compositions of this invention to actual practice can vary widely. Included among the variables that may be encountered are the degree of infestation of the plant by fungi, the particular plant being treated, the degree of development of the plant, the prevailing weather conditions such as temperature, relative humidity, rainfall, dews, etc. Hence, it may at times be a matter of choice and judgment as to the very best means of application of the particular compound, under the prevailing conditions, and for the particular purpose under consideration.

A further aspect of the invention resides in the unexpected discovery that the activity toward plants, as disclosed hereinbefore, of the copper salts of the halobenzenesulfonyl hydrazides can be enhanced by a simple expedient, namely, by metathetically forming such salts in situ in liquid formulations, particularly aqueous formulations, and more particularly aqueous formulations containing surfactant material. This is done conveniently and effectively merely by preparing a liquid formulation containing a desired concentration of a soluble salt of the halobenzenesulfonyl hydrazide, advantageously, an alkali metal salt, and mixing therewith a soluble copper salt such as copper sulfate, copper chloride, and the like. Ordinarily, stoichiometric amounts are used, although other proportions can be used if so desired. For example, suitable tank mixes are obtained using fifty to 200 percent of the stoichiometric proportions.

Suitable tank-mix formulations are obtained either by adding separately to the tank desired quantities of the alkali metal salt of the halobenzenesulfonyl hydrazide and a soluble copper salt, or by adding to the tank a prepared, dry-mix formulation containing both the alkali metal salt of the halobenzenesulfonyl hydrazide and the soluble copper salt. Surfactants and other adjuvants can also be included in such dry mixes, so that a tank mix can be made up simply by adding a prepared, dry-mix formulation to a tank of water.

It is to be understood that the invention is not to be limited to the exact details of operation or materials shown and described, as obvious modifications and equivalents will be apparent to one skilled in the art, and the invention is therefore to be limited only by the scope of the appended claims.

I claim:

1. A method for the control of phytopathogenic fungi comprising applying to plants subject to fungus infection, in a fungicidally effective amount, a compound selected from the class consisting of (a) compounds having the formula:

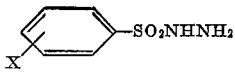

wherein X represents a halogen atom, (b) acid addition salts thereof, (c) alkali metal salts thereof, and (d) copper salts thereof.

2. A method for the control of phytopathogenic fungi comprising applying to plants subject to fungus infection, in a fungicidally effective amount, p-chlorobenzenesulfonyl hydrazide.

3. A method for the control of phytopathogenic fungi comprising applying to plants subject to fungus infection, in a fungicidally effective amount, p-bromobenzenesulfonyl hydrazide.

4. A method for the control of phytopathogenic fungi comprising applying to plants subject to fungus infection, in a fungicidally effective amount, the cupric salt of p-chlorobenzenesulfonyl hydrazide.

5. A composition suitable for the control of phytopathogenic fungi which comprises a carrier, a surfactant and a compound selected from the class consisting of (a) compounds having the formula:

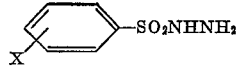

wherein X represents a halogen atom, (b) acid addition salts thereof, (c) alkali metal salts thereof, and (d) copper salts thereof.

6. A composition suitable for the control of phytopathogenic fungi which comprises p-chlorobenzenesulfonyl hydrazide, a carrier and a surfactant.

7. A composition suitable for the control of phytopathogenic fungi which comprises p-bromobenzenesulfonyl hydrazide, a carrier and a surfactant.

8. A composition suitable for the control of phytopathogenic fungi which comprises the cupric salt of p-chlorobenzenesulfonyl hydrazide, a carrier and a surfactant.

9. A composition suitable for the control of phytopathogenic fungi which comprises a compound selected from the class consisting of (a) compounds having the formula:

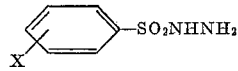

wherein X represents a halogen atom, (b) acid addition salts thereof, (c) alkali metal salts thereof, and (d) copper salts thereof, dispersed in a dusting powder.

10. A composition suitable for the control of phytopathogenic fungi which comprises a compound selected from the class consisting of (a) compounds having the formula:

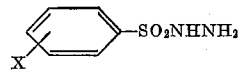

wherein X represents a halogen atom, (b) acid addition salts thereof, (c) alkali metal salts thereof, and (d) copper salts thereof, dispersed in a water-miscible solvent containing a surfactant.

11. A composition suitable for the control of phytopathogenic fungi which comprises a compound selected from the class consisting of (a) compounds having the formula:

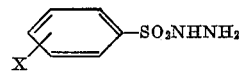

wherein X represents a halogen atom, (b) acid addition salts thereof, (c) alkali metal salts thereof, and (d) copper salts thereof, dispersed in water containing a surfactant.

12. A composition suitable for the control of phytopathogenic fungi which comprises a compound selected from the class consisting of (a) compounds having the formula:

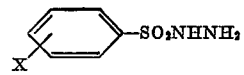

wherein X represents a halogen atom, (b) acid addition salts thereof, (c) alkali metal salts thereof, and (d) copper salts thereof, dispersed in a dusting powder containing a surfactant.

References Cited in the file of this patent

UNITED STATES PATENTS

| | | |
|---|---|---|
| 2,759,019 | Brown | Aug. 14, 1956 |
| 2,763,660 | Young | Sept. 18, 1956 |
| 2,766,226 | Hardy | Oct. 9, 1956 |
| 2,830,086 | Stempel | Apr. 8, 1958 |
| 2,850,425 | Gaertner | Sept. 2, 1958 |
| 2,870,056 | Jaworski | Jan. 20, 1959 |

OTHER REFERENCES

Frear: A Catalogue of Insecticides and Fungicides, vol. II, p. 23, 1948.